(12) United States Patent
Tundwal et al.

(10) Patent No.: US 11,630,946 B2
(45) Date of Patent: Apr. 18, 2023

(54) DOCUMENTATION AUGMENTATION USING ROLE-BASED USER ANNOTATIONS

(71) Applicant: MICROSOFT TECHNOLOGY LICENSING, LLC, Redmond, WA (US)

(72) Inventors: Kapil Kumar Tundwal, Kirkland, WA (US); Gabriele Masili, Mercer Island, WA (US); Micheal Scott Kuykendall, Snoqualmie, WA (US); Ray Ringhiser, Maple Valley, WA (US); Charlene Marie Douglass, Friday Harbor, WA (US); Martine Marthe Sylvie Arlette Smets, Bellevue, WA (US); Dalton Lafayette Young, Peoria, AZ (US); Jayasudha Thota, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 44 days.

(21) Appl. No.: 17/157,462

(22) Filed: Jan. 25, 2021

(65) Prior Publication Data
US 2022/0237367 A1 Jul. 28, 2022

(51) Int. Cl.
*G06F 17/00* (2019.01)
*G06F 40/169* (2020.01)
(Continued)

(52) U.S. Cl.
CPC ........ *G06F 40/169* (2020.01); *G06F 11/3466* (2013.01); *G06F 21/31* (2013.01)

(58) Field of Classification Search
CPC ..... G06F 40/169; G06F 11/3466; G06F 21/31
See application file for complete search history.

(56) References Cited

U.S. PATENT DOCUMENTS

| 6,985,893 B1 | 1/2006 | Warner et al. |
| 7,958,444 B2 * | 6/2011 | Jacquin ................. G06F 40/143 715/233 |

(Continued)

OTHER PUBLICATIONS

"Assembling a Team", Retrieved from: https://cloud.ibm.com/docs/knowledge-studio?topic=knowledge-studio-team, Retrieved on Dec. 7, 2020, 6 Pages.

(Continued)

*Primary Examiner* — Mohammed H Zuberi
(74) *Attorney, Agent, or Firm* — NovoTechIP International PLLC

(57) ABSTRACT

A system and method for performing role-based user annotation of product documentation is disclosed. The system identifies first and second roles for first and second users, respectively; causes, based on the first role, a first user interface to display on a first client device to receive a first input associated with the default document from the first user; creates a first layer of annotation on the default document based on the first input; receives a request to access the document from the second user; determines, based on the first and second roles, whether to merge the first layer of annotation to the default document for generating an output document; causes a second user interface to display the output document on a second client device; and causes the first input and the output document to be applied for document performance analysis associated with one or more entities.

18 Claims, 11 Drawing Sheets

(51) Int. Cl.
*G06F 11/34* (2006.01)
*G06F 21/31* (2013.01)

(56) References Cited

U.S. PATENT DOCUMENTS

| | | | | |
|---|---|---|---|---|
| 8,977,953 | B1* | 3/2015 | Pierre | G06F 40/289 |
| | | | | 715/201 |
| 9,069,580 | B2 | 6/2015 | Armstrong et al. | |
| 9,189,467 | B1* | 11/2015 | Patnoe | G06F 16/00 |
| 9,286,567 | B1 | 3/2016 | Martinez et al. | |
| 9,805,427 | B2 | 10/2017 | Jemiolo et al. | |
| 9,880,989 | B1* | 1/2018 | Cadabam | G06F 40/151 |
| 10,171,472 | B2 | 1/2019 | Furtado et al. | |
| 2005/0289452 | A1* | 12/2005 | Kashi | G06F 40/169 |
| | | | | 715/268 |
| 2006/0026502 | A1* | 2/2006 | Dutta | G06F 40/166 |
| | | | | 715/201 |
| 2006/0031755 | A1* | 2/2006 | Kashi | G06F 40/171 |
| | | | | 382/187 |
| 2007/0005592 | A1 | 1/2007 | Kender et al. | |
| 2007/0208994 | A1* | 9/2007 | Reddel | G06F 40/197 |
| | | | | 715/205 |
| 2010/0058197 | A1 | 3/2010 | Chee et al. | |
| 2010/0153835 | A1* | 6/2010 | Xiong | G06F 40/169 |
| | | | | 715/230 |
| 2011/0289401 | A1* | 11/2011 | Fischer | G06F 40/103 |
| | | | | 715/232 |
| 2012/0284605 | A1* | 11/2012 | Sitrick | G06F 17/00 |
| | | | | 715/230 |
| 2012/0284635 | A1* | 11/2012 | Sitrick | G06F 40/169 |
| | | | | 715/751 |
| 2012/0284642 | A1* | 11/2012 | Sitrick | G06F 40/197 |
| | | | | 715/753 |
| 2013/0013999 | A1* | 1/2013 | Kerry-Tyerman | G06Q 50/18 |
| | | | | 715/230 |
| 2013/0024418 | A1* | 1/2013 | Sitrick | G06F 16/00 |
| | | | | 707/608 |
| 2013/0054636 | A1* | 2/2013 | Tang | G06F 40/169 |
| | | | | 707/769 |
| 2013/0185657 | A1 | 7/2013 | Gunawardena et al. | |
| 2014/0006922 | A1* | 1/2014 | Smith | G06F 40/143 |
| | | | | 715/234 |
| 2014/0245141 | A1 | 8/2014 | Yeh et al. | |
| 2014/0281875 | A1* | 9/2014 | Branton | G06F 40/169 |
| | | | | 715/230 |
| 2014/0281877 | A1* | 9/2014 | Burge | G06F 40/169 |
| | | | | 715/230 |
| 2015/0100569 | A1* | 4/2015 | Reis De Sousa | G06F 16/9535 |
| | | | | 707/723 |
| 2015/0100872 | A1* | 4/2015 | Beezer | G06F 3/0482 |
| | | | | 715/230 |
| 2015/0244892 | A1* | 8/2015 | Arputharaj | H04N 1/04 |
| | | | | 358/473 |
| 2015/0248387 | A1* | 9/2015 | Mattingly | G06Q 50/184 |
| | | | | 715/230 |
| 2015/0339050 | A1* | 11/2015 | Vong | G06T 11/60 |
| | | | | 345/173 |
| 2016/0321214 | A1* | 11/2016 | Hickey | G06F 40/169 |
| 2018/0052813 | A1* | 2/2018 | Laupretre | G06F 40/171 |
| 2019/0147402 | A1* | 5/2019 | Sitrick | H04L 12/1822 |
| | | | | 705/301 |
| 2020/0106813 | A1 | 4/2020 | Vendrow et al. | |

OTHER PUBLICATIONS

"Help: Page History", Retrieved From: https://en.wikipedia.org/w/index.php?title=Help:Page_history&oldid=1000272193, Jan. 14, 2021, 6 Pages.

"Pageviews Analysis", Retrieved From: https://meta.wikimedia.org/w/index.php?title=Pageviews_Analysis&oldid=20123736, May 29, 2020, 6 Pages.

"International Search Report and Written Opinion Issued in PCT Application No. PCT/US21/064471", dated Apr. 5, 2022, 12 Pages.

* cited by examiner

| Role | Front-end/Back-end User | Example User | Permissions/Rights |
|---|---|---|---|
| Content Writer | manufacturer/vendor User | Editor/Publisher | Write/Publish Content Y |
| Annotator | Entity User | IT staff/administrator/product-customizer | Add annotation X to Y |
| Annotated Content User | Entity User | Employee | View Y+X |

FIG. 3

DOCUMENTATION AUGMENTATION USING ROLE-BASED USER ANNOTATIONS

BACKGROUND

A configurable software or hardware product is currently a conundrum. While a product such as Microsoft Office® or Windows® provides users, particularly commercial users, the ability to make extensive customizations to configure the product to meet the needs of an organization and/or users, the customizations may not be reflected by the self-serve documentation (e.g., default supporting articles, help topics) that are traditionally only modified by product manufacturers or vendors. This mismatch between the default documentation and customized product may cause confusion or problems for product users. Additionally, it is also difficult to obtain usage and feedback metrics about the use of self-serve documentation by specific product users, e.g., users in an organization/entity. The usage and feedback metrics are very helpful to understand user interests, needs, or issues, improve user experience, and enhance product/service quality. On the entity side, different documentation access by different users may be invisible to any specific user and thus overall usage and feedback data may be unavailable. On the vendor/manufacturer side, it may require complex and time-consuming analysis to obtain such data when a large number of users in a large number of entities are using the products.

Hence, there is a need for a system and method for configuring the default self-serve documentation to adapt to product configurations and user needs, and automatically generating documentation usage and feedback metrics.

SUMMARY

In one aspect, an annotation authoring management system for annotating a default document by a user includes a processor, and a memory, coupled to the processor, configured to store executable instructions. The instructions, when executed by the processor, cause the processor to identify a first role for a first user and a second role for a second user; cause, based on the first role of the first user, a first user interface to display on a first client device of the first user to receive a first input associated with the default document from the first user; create a first layer of annotation on the default document based on the first input; receive a request to access the document from the second user; determine, based on the first role and the second role, whether to merge the first layer of annotation to the default document for generating an output document; cause a second user interface to display the output document on a second client device of the second user, and cause the first input and the output document to be applied for document performance analysis associated with one or more entities.

The above general aspect may include one or more of the following features: transmitting the first input from the first user and the output document displayed to the second user to a report server, wherein the report server, in response to receiving the first input and the output document, is configured to: track user interactions with the default document, wherein the user interactions include at least one of search, view, edit, feedback related to the default document, analyze and classify the user interactions, generate analytical data based on analyzing and classifying the user interactions, and generate a report based on the analytical data; causing a third user interface to display on the first client device of the first user to receive a second input upon the first input of the default document from the first user; receiving credential data from the first user and the second user, authenticating the first user and second user based on respective credential data, and responsive to authenticating the first user and second user, identifying the first role for the first user and the second role for the second user based on respective user data retrieved from a user database; receiving a plurality of inputs of the default document from a plurality of users, creating a plurality of layers of annotation on the default document based on the plurality of inputs, identifying a number of layers of annotation based on the second role of the second user and a plurality of roles associated with the plurality of users, and merging the identified layers of annotation to the default document to generate the output document; creating a plurality of layers of annotation on the default document while maintaining the default document unchanged.

These general and specific aspects may be implemented using a system, a method, or a computer program, or any combination of systems, methods, and computer programs.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 3 is an example table of user/operator roles.

DETAILED DESCRIPTION

Figure 1:
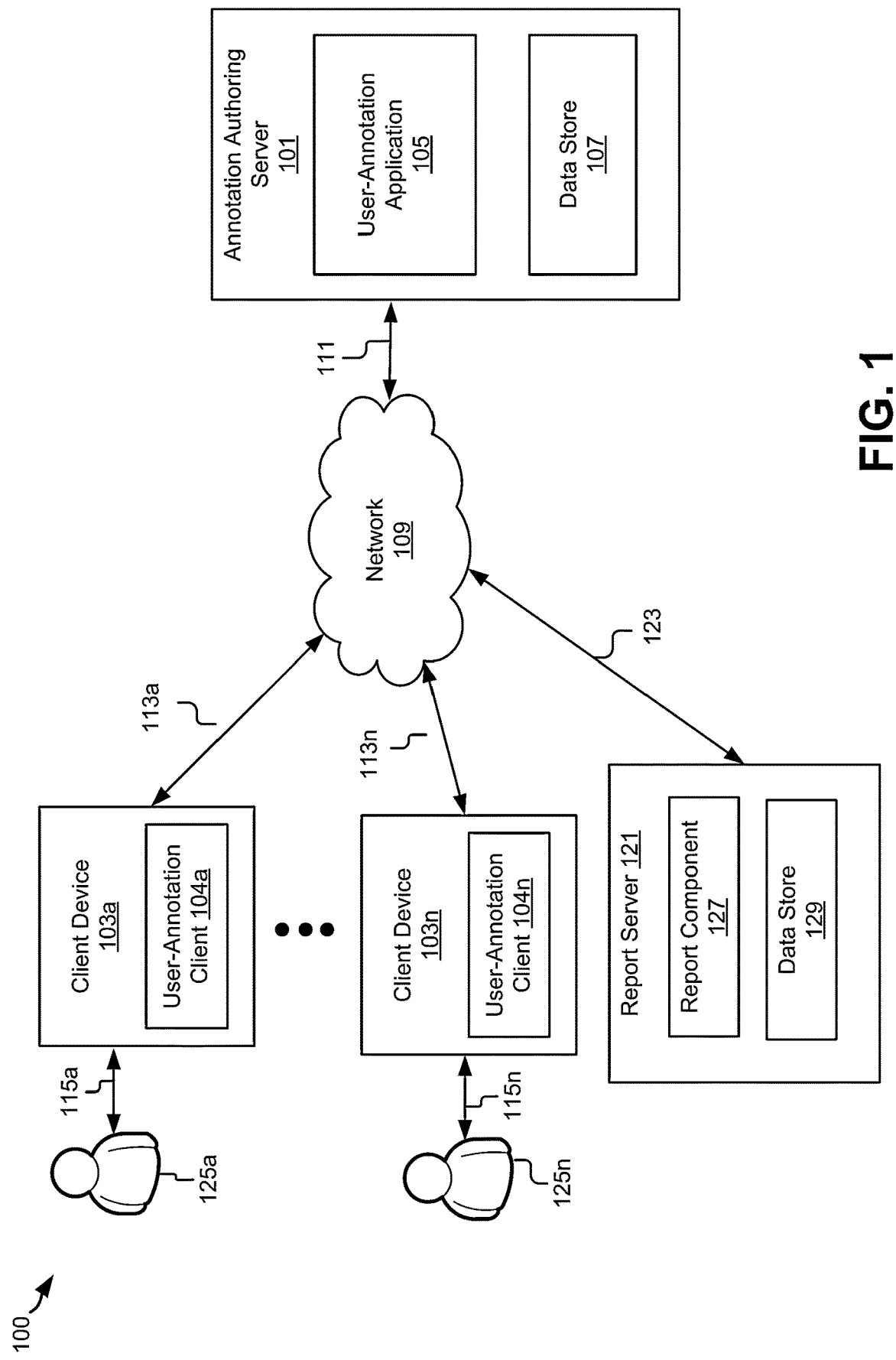
FIG. 1 is a block diagram of an example annotation authoring management system.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

A product consumer, e.g., an organization that purchased a hardware product such as a medical device or a company that licensed a software product, may have tens, hundreds, or thousands of end-users in their entities to use the product. A few representative users assigned with certain rights/roles (e.g., administrators) may utilize certain tools to configure and customize the product to adapt to certain needs of the entity and/or the end-users. But such assigned roles do not allow the representative users/consumers (not product vendor or manufacturer employee) to make any edits to the self-serve documents of the product such as help articles, virtual agent-bot-dialogs, instant answers, multimedia deliverables, etc. Therefore, one technical problem is that the self-serve documents intended to enable scalable support for end-users no longer match the unique entity-based product installations, customizations, and changes, i.e., what the end-users or product users in the entity are seeing and using. Another technical problem is that there is no easy way for both the product vendors/manufacturers and product users to find out how much documentation actually may be used by the end-users in an entity, for example, which help topics cause most user confusion and questions, which pages the end-users are most interested in, at what time the users initiate the largest number of virtual agent dialogs, etc.

To address the above technical problems, the technical solution described in the present application provides a role-based annotation-capable web-based front-end authoring tool. This front-end authoring tool allows the front-end consumers or product users to perform limited authoring operations on base or default documentation, whereas only the product vendor or manufacturer may perform full authoring operations. In one implementation, the limited authoring operations include user annotation on a document. A user annotation may be overlaid on the document without modifying the document content. The user annotation captures the product customizations, policy changes, or other features unique to the end-users and the entity where the product is being used. The user annotation may be provided in a web-based environment that is friendly to end-users of entities.

The technical solution described herein is advantageous in multiple aspects. First, the technical solution described herein allows product consumers (e.g., organizations, companies, universities, and other entities) to annotate the product documentation such that the annotated documentation matches the configurations that the product consumers have made to the product, thereby increasing the accuracy and facilitating efficient use of product documentation. A product user, who searches a support document for an answer to solve his/her problem or guidance to perform an action, would find the document itself is sufficient, and thus no extra computer resources and network bandwidth need to be spent on the user search. The technical solution described herein also provides product users in an entity real-time and inline guidance on the use of product features/elements to ensure alignment with the entity's processes, policies, and procedures. This may avoid a product user from deviating to outside resources to seek help. For example, if a user is unaware of a change made to a product function that fits the entity's special need due to the outdated default document, the user may have to access a different system to directly contact the product manufacturer to fix the problem. By providing real-time and inline guidance, again, the technical solution described herein not only reduces the communication amounts and delays but also reduces computer resources and network bandwidth usage that are otherwise needed.

The technical solution described herein further provides end-users with the preferred support path for each area within the product, thereby decreasing time-to-resolution and reducing support costs in technical and financial senses. More importantly, this preferred support path is concise and clear. A user can leverage the taxonomy of the support path to easily navigate from one page to another page such that no navigation to layers of views/menus is needed, which is particularly beneficial when the user is looking for support with an electronic device of limited capacity (e.g., a small screen device such as a mobile phone).

The mechanism of the technical solution also ensures secure data communication. As described below, the annotations of a default document do not modify the document and thus maintain the security and integrity of the original document. In one implementation, the annotations are layered upon the original document. A specific user with a specific role can only retrieve specific layer(s) of annotations, and thus annotations added by organization A are only visible to members of organization A and would not be compromised by members of organization B who also have access to the same document. Moreover, by extending certain functionality to end-users with certain roles, the technical solution may allow the end-user/consumer side to access their users' usage, performance, and feedback data for each help article, and use such data to get insights into how the end-users actually use the product, which further facilitates the efficient use of products.

FIG. 1 is a block diagram of an example annotation authoring management system 100. As shown, the system 100 includes an annotation authoring server 101, a report server 121, and one or more client devices 103a-103n coupled for electronic communication via a network 109. It should be understood that the system 100 depicted in FIG. 1 is provided by way of example and the system 100 and/or further systems contemplated by this present disclosure may include additional and/or fewer components, may combine components and/or divide one or more of the components into additional components, etc. For example, the system 100 may include any number of annotation authoring servers 101, report server 121, client devices 103a-103n, or networks 109.

The network 109 may be a conventional type, wired and/or wireless, and may have numerous different configurations including a star configuration, token ring configuration, or other configurations. For instance, the network 109 may include one or more local area networks (LAN), wide area networks (WAN) (e.g., the Internet), public networks, private networks, virtual networks, mesh networks, peer-to-peer networks, and/or other interconnected data paths across which multiple devices may communicate. The network 109 may also be coupled to or include portions of a telecommunications network for sending data in a variety of different communication protocols. In one implementation, the network 109 includes Bluetooth® communication networks or a cellular communications network for sending and receiving data including via short messaging service (SMS), multimedia messaging service (MMS), hypertext transfer protocol (HTTP), direct data connection, WAP, email, etc.

The client devices 103a-103n (or collectively client device 103) may include virtual or physical computer processors, memory(ies), communication interface(s)/device (s), etc., which, along with other components of the client device 103, are coupled to the network 109 via signal lines 113a-113n for communication with other entities of the system 100. In one implementation, the client device 103a-103n, accessed by users 125a-125n via signal lines 115a-115n respectively, may send and receive data to and from other client device(s) 103 and/or the annotation authoring server 101, and may further analyze and process the data. For example, the client devices 103a-103n may communicate with the annotation authoring server 101 to provide annotations on a document and output the annotations for displaying to specific users. Non-limiting examples of client device 103 may include a laptop computer, a desktop computer, a tablet computer, a mobile telephone, a personal digital assistant (PDA), a mobile email device, or any other electronic devices capable of processing information and accessing the network 109.

As depicted, the client device 103 includes a user-annotation client 104. For example, the client device 103a includes a user-annotation client 104a and the client device 103n includes a user-annotation client 104n. In one implementation, the user-annotation client 104 may be an application rendered in a browser displayed on a user interface associated with a user. An application may be implemented on both the client-side/front-end and the server-side/back-end. The application may be Microsoft C3 Tool®. In one implementation, the client-side application may communicate with the server-side application to receive and process annotations and associated documentation. The server-side application may include a What You See Is What You Get (WYSIWYG) editor tool for back-end operators of product manufacturers/vendors to perform every type of content editing. In one implementation, the user-annotation client 104 may be configured to be a lightweight and web-based application that is implemented on the front-end (e.g., via authoring interfaces) for end-users to access (e.g., view, annotate) product documents (e.g., help articles). Depending on whether users are authenticated and/or possess certain user roles, a user may also access additional information, for example, access to the article taxonomy, usage and performance data for each help article, and user feedback for each help article, etc.

The report server 121 may be a computing device that communicates with the annotation authoring server 101 and one or more client devices 103 to collect user interaction data and analyze the data to generate a report. The user interaction may include at least one of a search, view, edit, comment, or other types of interactions with a product document. In one implementation, the report server 121 may reside on the client side to monitor document use from end-users of a particular entity and report the document use statics associated with the particular users in that particular entity. For example, the report server 121 may allow an executive manager of an organization to view usage and performance data for each help article and read user feedback for each help article received from the users in that organization. As depicted, the report server 121 may include a report component 127 and a data store 129. The report component 127 may receive and process user interaction data to generate a report, which will be described in detail below with reference to FIG. 2B. The data store 129 stores user interaction data, statics or analytical data, reports, report metadata, and any other types of data used for generating a report. In one implementation, the user interactions may be categorized as events, and the data store 129 may include an event database to store data of the events. The report server 121 is communicatively coupled to the network 109 via signal line 123.

The annotation authoring server 101 may be a computing device that communicates with one or more client devices 103 and the report server 121 to configure user roles and manage the document annotation process based on the user roles. The annotation authoring server 101 may provide access rights to a few users to annotate product documents while allowing only view rights to the remaining users. In one implementation, the annotation authoring server 101 may communicate with a separate document server (not shown) that stores the product documents to implement the functionality described herein. In another implementation, the annotation authoring server 101 may serve as a document server for storing and managing product documents. The annotation authoring server 101 may also cooperate with the report server 121 to track and analyze the user interactions with the product document to generate a report. The annotation authoring server 101 is communicatively coupled to the network 109 via signal line 111.

As depicted, the annotation authoring server 101 includes a user-annotation application 105, which is a server-side application that communicates with the client-side application residing on the client device 103, i.e., the user-annotation client 104, to manage user document annotation and viewing based on user roles. The application may be Microsoft C3 Tool®. The user-annotation application 105 may empower selected end-users (i.e., commercial customer administrators) to add annotations to product support documents (e.g., Microsoft Office® end-user help articles). The user-annotation application 105 may add each annotation as a layer overlaid on the document without modifying the default or base content provided by product manufacturers or vendors. Therefore, the original document content is secured. The user-annotation application 105 may then provide the annotated content to certain end-users. For example, each user in a company, who has authenticated and logged into the system 100, may be determined to view an annotation added by an administrator of the same company. Therefore, the annotated content is also secured. Moreover, the user-annotation application 105 may allow each product consumer/entity to access and analyze the usage data of different support documents by that particular entity to generate corresponding usage and performance metrics. The user-annotation application 105 may further aggregate the metrics about the use of help content from each entity by industry, segment, geography, etc., to provide valuable information to the product manufacturer/vendors to improve the product and become an industry differentiator. The user-annotation application 105 may provide additional functionalities such as translating the annotations to different languages, create targeted content based on performance metrics collected from different entities, etc. The user-annotation application 105 will be described in more detail below with reference to FIG. 2A.

Although only one user-annotation application 105 is depicted in FIG. 1, it is possible that one or more instances of user-annotation application 105 also reside on the report server 121. Each instance may be configured to perform certain functionalities depending on where the instance resides. In one implementation, the annotation authoring server 101 may be a cloud server owned by manufacturers/vendors. The annotation authoring server 101 may implement complex functionalities such as user authentication, user role management, annotation management, overall metric analysis, etc. The report server 121, on the other hand, may be owned by a particular product consumer/entity. The report server 121 may perform tasks related to the particular entity such as user interaction monitoring and management, local report generation and update, etc. In one implementation, the report server 121 may also include an instance of the user-annotation application 105 to implement certain functionalities such as user authentication and/or annotation management for the end-users of the particular entity. In one implementation, the user-annotation client 104 implemented on the client device 103 may be another instance of the user-annotation application 105. The user-annotation client 104 may be used to perform limited client-side tasks, for example, requesting a document, viewing the documentation, and/or annotating the document via a web browser installed on the client device.

In one implementation, the annotation authoring server 101 also includes a data store 107. The data store 107 may include a user database and a document database. The user database stores user data or consumer data. The user data may include user identity information such as an entity that a user belongs to, a job role of the user, a location of the user, etc., and user account information used for registering and authenticating the user. The document database stores document data of documentation related to different types of products. The document data may include a document's type, content, author, version, creation time, access time, access interval, modification, etc. In one implementation, the document database may reside on a separate document server. The data store 107 also stores any other information related to the operations described herein, such as aggregated usage and performance metric data from each entity, targeted content generated based on the metric data, overall reports, etc.

Figure 2A:
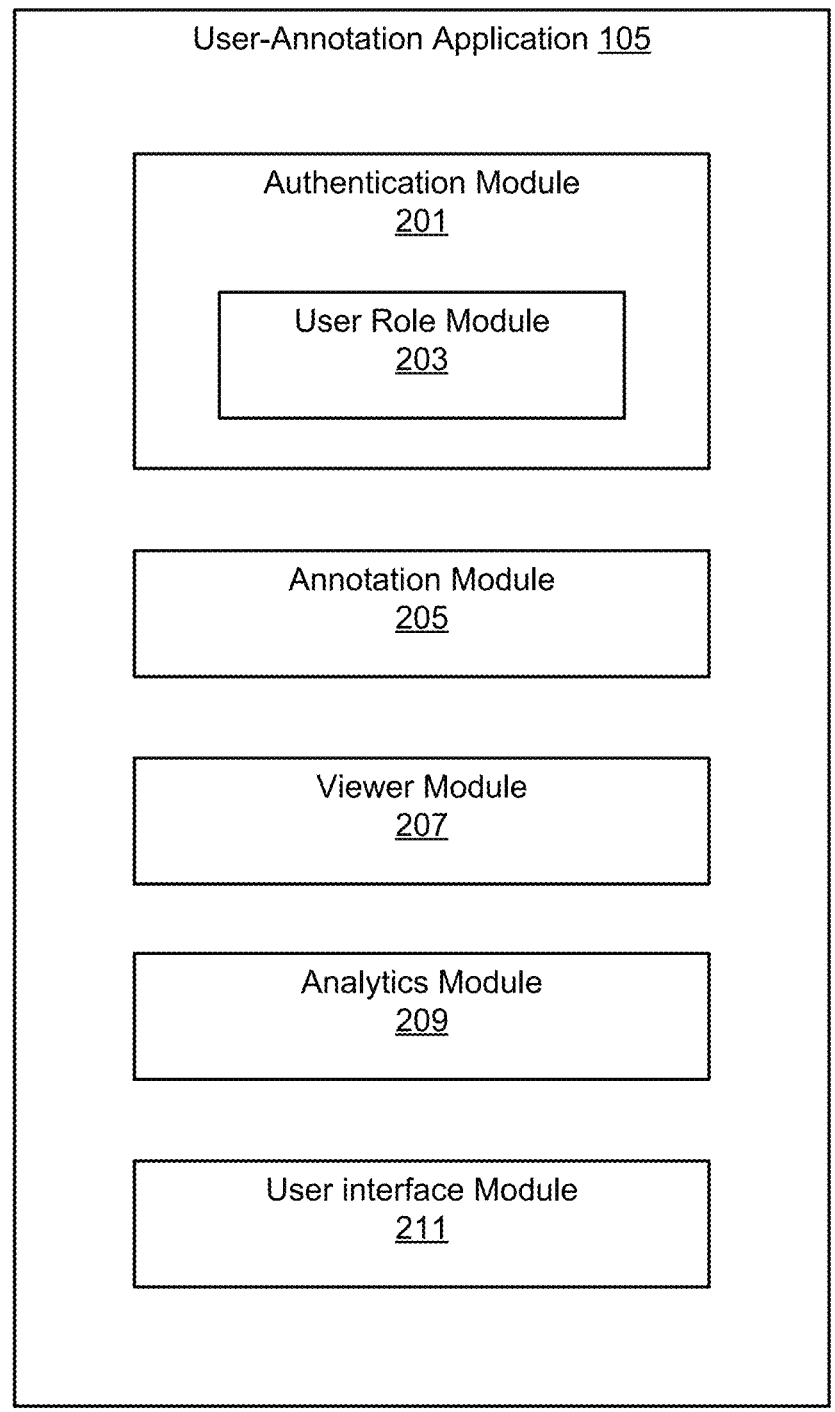
FIG. 2A is a block diagram of example components of a user-annotation application residing on an annotation authoring server.

FIG. 2A is a block diagram of example components of a user-annotation application 105 residing on the annotation authoring server 101. The user-annotation application 105 includes hardware and/or software logic for determining user roles for authenticated users, receiving annotations of documents and presenting the documents along with appropriate annotations to users based on the determined user roles, and generating analytical data based on the user interactions associated with the documents and/or annotations.

In one implementation, the user-annotation application 105 includes an authentication module 201, an annotation module 205, a viewer module 207, an analytics module 209, and a user interface module 211. The authentication module 201 may receive user credential data from a user and authenticate the user based on the credential data. The user may be an entity user that uses a product and accesses the product documentation on the client side. The user may also be a manufacturer/vendor user that manages the product uses and maintains the product documentation on the server side. For clarity, the terms "user" or "end-user" will be used to represent entity/client user/consumer hereafter unless it is specified otherwise, and the user-annotation application 105 will mainly be described in the context of client users although functionalities of some modules of the user-annotation application 105 (e.g., the authentication module 201) may also be applied to a manufacturer operator or vendor operator.

In one implementation, when the user 125 requests authentication through the user-annotation client 104 on the client device 103, the authentication module 201 may identify and authenticate a user account associated with a user belonging to an entity. The user authenticator 260 may be configured to receive and process credentials in the form of a username and password hash, where the username includes both an entity identifier and an individual user identifier. In an implementation, the authentication module 201 supports the use of credentials obtained from external authentication services (e.g., tokens issued by a single sign-on (SSO) service), and may associate user account identifiers provided by such services with their respective user accounts. The authentication module 201 may also issue an access token to an authenticated user, which along with the user role assigned to the user may enable the user to view and/or annotate a document.

In an implementation, the authentication module 201 includes a user role module 203. The user role module 203 may determine a user role for an authenticated user who requests access to a product document. The product document may be default/out-of-the-box documentation such as help articles, virtual agent-bot-dialogs, instant answers, multimedia deliverables, etc. Currently, an authenticated manufacturer/vendor operator is provided either of two permission-based roles: publisher or author. A trusted content author may have publisher permissions/rights, which enables him/her to edit the content of the product documentation and publish new versions on a content source (e.g., a website) for consumption by all users including client-side and server-side users. An ordinary content author with author permissions/rights can make proposed edits to the content of the product document. These edits will then be automatically routed to a specific editor who is responsible for the performance of the help document. The specific editor is a publisher with permissions/rights who can review the proposed edits, determine which edit should be accepted or rejected, and ultimately publish an updated version containing accepted edits. However, instead of managing the permission rights of back-end manufacturer/vendor operators, the user role module 203 assigns certain authoring rights to the authenticated entity/client users in handling the product documents. In one implementation, the user role module 203 adds two additional permission levels: annotator and annotated content user, to be assigned to client/entity users that consume the product and assess the product documents.

FIG. 3 is an example table 300 of user/operator roles. As shown in the table, role 301 indicates the role levels to be assigned. The front-end/back-end user 303 indicates whether role 301 may be assigned to a front-end-user or a back-end operator. The example user 305 indicates the specific operators or users in the front-end or back-end who may have the corresponding role 301. The permissions/rights 307 indicate what operation(s) the specific operators or users with the corresponding role 301 can perform on a default product document. A role "Content Writer" 311 is identified as shown in the first row of table 300, which corresponds to the editor role and publisher role aforementioned that are assigned to manufacturer or vendor employees. With this role, the manufacturer/vendor operators can perform full authoring operations such as writing or publishing content Y, where content Y is the base or default product document provided to entity users.

Unlike the "Content Writer" role assigned to the back-end-user, i.e., manufacturer or vendor employees, however, the user role module 203 may assign the "Annotator" role 313 and "Annotated Content User" role 315 shown in the shaded rows to entity users. In one implementation, the user role module 203 may retrieve user data from a database included in the data store 107, and identify an annotator or an annotated content user based on the retrieved user data. The user data may include a user's job role such as a chief executive officer (CEO), a department manager, an engineer, etc. When a user is an information technology (IT) staff, administrator, or product-customizer that is responsible for product configuration and customization in the entity, the user role module 203 may determine this user as an annotator 313. In one implementation, the user role module 203 only assigns the annotator role 313 to a limited number of entity users while leaving the remaining entity employees as annotated content users 315. The annotator 313 may add annotation X to the default document content Y while the annotator content viewer 315 may only view the annotation X and content Y. In another implementation, the user role module 203 may identify which entity users can be annotated content users 315. For example, the user role module 203 may determine annotations to certain products are only available to a certain department, and thus assign the annotation content viewer rights to members of that department.

Referring back to FIG. 2A, the annotation module 205 may determine whether a user is associated with an annotator role, and in response to the user being an annotator, support the annotator to provide annotation(s) to default document(s). For example, the annotator may be an administrator that is responsible for implementing a purchased or licensed hardware or software product across the entity/organization. The annotation module 205 may allow the administrator/annotator to annotate default document(s) to tailor the out-of-box product documentation in the same way the administrator tailors the product with configuration, settings, and customizations. As a result, the annotated document may match the document(s) to specific product configuration changes. Without such annotation, the default documentation does not reflect custom configurations, making it less helpful for end-users. Currently, many organizations may have specific processes, policies, and procedures they want their end-users to follow when using purchased/licensed hardware/software products. While the specific changes may be documented in standalone online or printed guides, the disconnection of the changes from the applicable product documentation may lead to a lack of compliance.

Figure 4A:
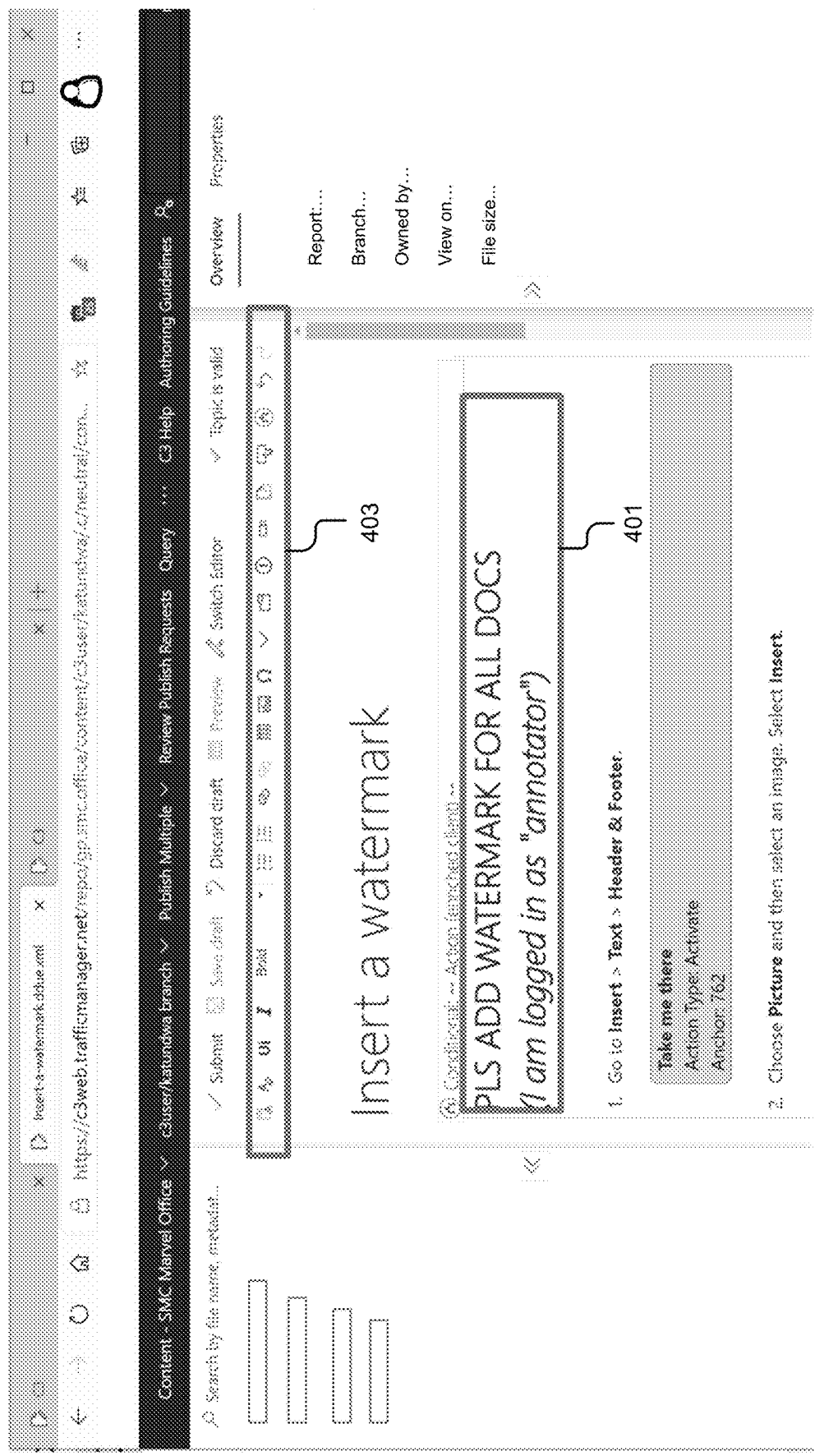
FIG. 4A is an example graphical user interface provided to an annotator to add an annotation.

FIG. 4A is an example graphical user interface provided to an annotator to add an annotation. Suppose an end-user in company A wants to insert a watermark onto a company document (e.g., a Microsoft® word document). Because this user is unfamiliar with how to insert a watermark, he/she accesses the manufacturer's help topic (e.g., Microsoft® Help topic). Following the steps in the default help topic, the user successfully enters the "Draft" watermark. However, this is problematic because the company has mandated every employee use "Confidential" instead of "Draft." The default document does not reflect the product customization. To solve this problem, the user role module 203 may identify an IT staff or administrator as an annotator by assigning an annotator role. The annotation module 205 may communicate with the user interface module 211 (described below) to generate an authoring interface, for example, the interface shown in FIG. 4A, for the annotator to add annotations to the product document. In area 401 of "please add watermark for all docs," the annotator can add the company requirement for handling the watermark. The toolbar 403 shows the editing tools that are available to the annotator. In one implementation, the annotation module 205 may be configured to provide a subset of editing tools available to manufacturer/vendor publishers/editors, i.e., users with "content writer" roles. The annotation module 205 may also configure the toolbar 403 by modifying the subset size and/or tools to meet different user needs. The annotator may use the tools to highlight the annotations with different colors, fonts, etc., such that the supersede information that entity administrators have contributed would not be ignored by end-users who need to know how to use products in the context of his/her entity.

The annotation module 205 provides options (e.g., authoring interface including editing tools) for an annotator to add text, insert images, or incorporate other multimedia edits such as audio/video files. Based on the annotator's input, in one implementation, the annotation module 205 may add an annotation as a logical layer or physical layer on the base or default document content. For example, the annotation module 205 may generate an overlay of annotation on top of the base content. The annotation module 205 may also utilize the layer of annotation to hide document content that may be outdated or cause confusion. More importantly, this layer structure may ensure that the content of the base document content is unchanged by any annotations from annotators of consumer entities. In other words, the client-side annotators cannot delete or modify any of the manufacturer's default/out-of-the-box documentation.

Figure 4B:
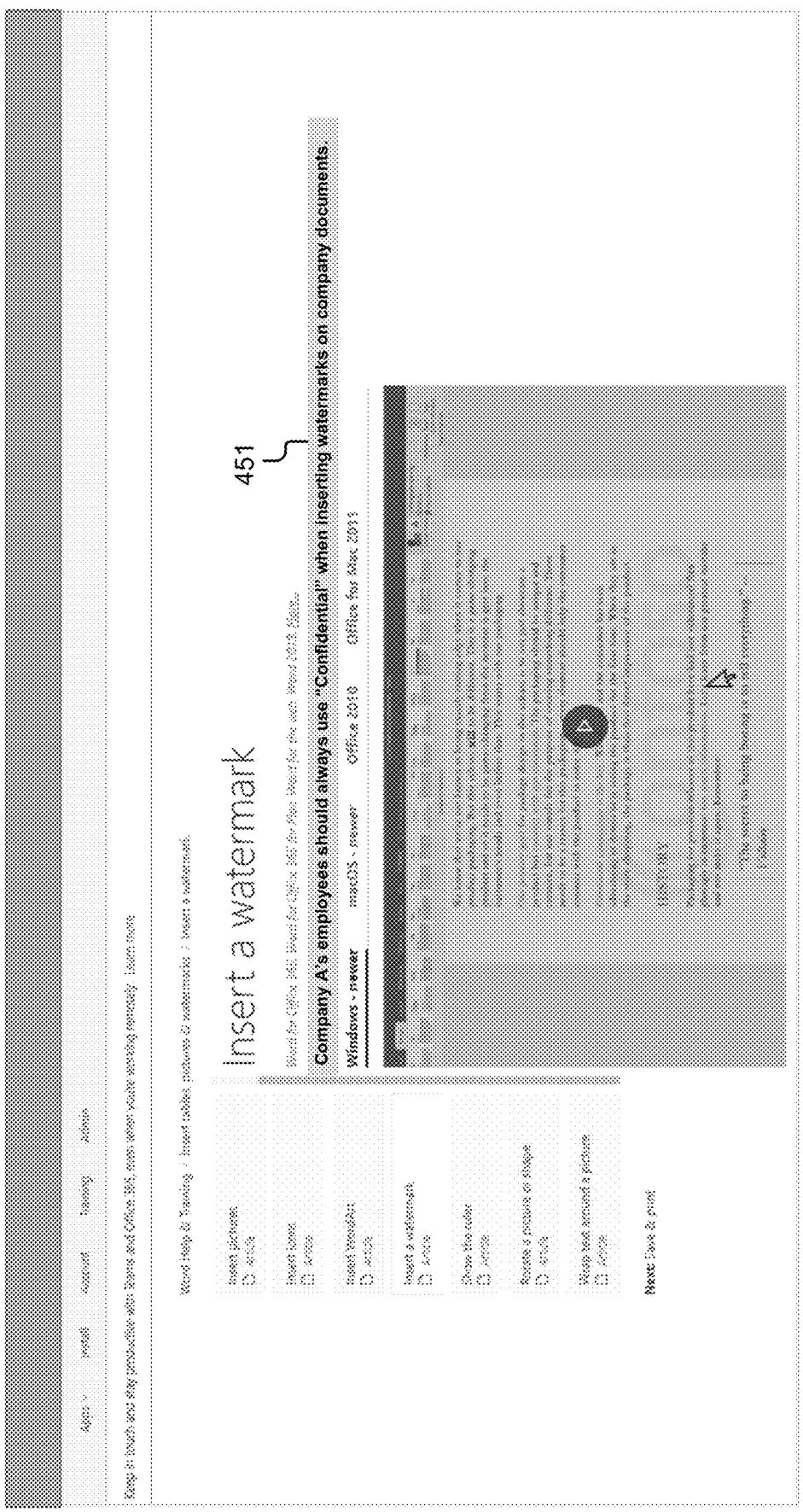
FIG. 4B is an example graphical user interface presenting an annotation.

The annotation module 205 may support the annotators/product customizers to add annotations to each article to provide clarity on whether a particular feature or setting is available as the product customizers have configured the product. Based on the annotation, the product users would not be misguided when taking an action. Continuing with the example in FIG. 4A, if company A wants its employees to use a consistent watermark on company documentation to be in alignment with company legal guidance, an administrator or annotator can add a note such as "Company A's employees should always use the 'Confidential' watermark" on help articles related to watermarks, as shown in 401 of FIG. 4B. Therefore, in addition to the instructions to complete the insertion, the end-user is also advised of company A's policy and uses the correct watermark. The annotation module 205 may also allow the annotators to mark selected content of default documentation as hidden.

Additionally, the annotation module 205 may use the annotations to clarify that end-users should contact inside IT department in the entity instead of contacting product vendors when end-users seek assistance with particular product areas, thereby significantly reducing the amount of data communications and decreasing the network bandwidth usage. The annotation module 205 may also communicate with a language module (not shown) to translate annotations to different languages such that annotations may provide desired across-language product support remedies for end users all over the world. The annotation module 205 may further support the annotators to make use of specific variable substitutions that the vendor has enabled in the documentation. In one implementation, responsive to receiving a report showing usage and performance data for each help article, the annotation module 205 may cause an authoring interface to display to an annotator to add a further annotation for a help article on top of a previously added annotation. The report will be described below with reference to the user analytics module 225.

The annotation module 205 may associate each layer of annotation with annotation metadata. The annotation metadata may include a user identifier of the user who created the annotation, an entity identifier of the entity that the user belongs to, creation time, modification time, etc. The annotation module 205 may transmit the annotations and associated annotation metadata to the viewer module 207 for further processing.

The viewer module 207 may process an end-user's view request. When a user (e.g., the user 125a) requests to view a product document via the client device 103*a*, the viewer module 207 may identify the user role for the user 125*a* and determine whether to provide a default/base document or an annotated document to the user 125*a*. If the annotated document is provided, the viewer module 207 may also identify which annotation(s) should be merged to the default document for presenting to the user 125*a*.

Administrators/annotators in an entity can integrate the entity's applicable processes, policies, and procedures directly into the product documentation. The documentation serves as the tool that users or viewers seek clarity on using different product aspects. In one implementation, the viewer module 207 may determine that annotations created by annotators from an entity are available for view by users with annotation content view roles (i.e., annotation content viewers) in the same entity. The annotators may also have access to the content data presented to the annotation content viewers. In some scenarios, an entity's annotations are visible for all authenticated users/employees of that entity.

The viewer module 207 may determine that annotations made for one entity are only visible to annotation content viewers of that entity but not to other users of other entities. However, an annotation may conceal content (e.g., to avoid confusion) instead of adding content. In such a case, the viewer module 207 may not apply this content hidden rule for one entity to another entity. Therefore, the content hidden by annotation of one entity is only invisible to users of that entity but visible to other users of other entities. Although each user can only see the annotation made to his/her entity, the viewer module 207 would allow the product vendor to access every annotation.

In one implementation, multiple layers of annotations may be created for a default document based on multiple inputs from annotators. Responsive to receiving an access request to the default document from an annotation content viewer, the viewer module 207 may identify which of multiple layers of annotations can be presented to the annotation content viewer. For example, the viewer module 207 may categorize the annotations based on the entity identifier included in the annotation metadata associated with each annotation, and identity the layer(s) of annotation for presentation based on the categories. The viewer module 207 may merge the identified layers of annotation to the default document to generate an output document and communicate with the user interface module 211 to display the output document on a user interface associated with the annotation content viewer. The process of merging content will be further described below with reference to FIG. 6.

The analytics module 209 may receive and analyze usage data associated with product documentation from product consumers/entities. Currently, only administrators of the product manufacturers and vendors may have permissions/rights to monitor and track the documentation usage and performance by users from individual entities, which is complex and time-consuming. Even if the product vendor receives an unusually high amount of inquiries about a specific help topic from a specific entity, it may not have an efficient approach to identify and address the issue because the entity has no visibility to how its end-users utilize the help topics and thus cannot help identify any issues. With the annotator role and annotation content viewer role assigned to end-users of product consumers/entities, the analytics module 209 may collect the usage and performance data/metrics from each entity, analyze the received data, and generate analytical data and/or reports for improving product performance. In one implementation, the analytics module 209 may aggregate the metrics about the use of help content from each entity by industry, segment, geography, etc. Based on the aggregated data, the analytics module 209 may identify the problematic area or interesting area and communicate with other modules (not shown) to determine and take action to remedy or add additional functionality to meet consumer needs. For example, the analytics module 209 may create targeted content based on performance metrics collected from different entities.

The user interface module 211 receives instruction(s) from the annotation module 205 to send graphical data to the client device 103, causing the client device 103 to present an authoring interface to an annotator of an entity such that the annotator can provide input to generate an annotation satisfying a special need of that entity. In one implementation, the user interface module 211 generates the graphical data for providing a user interface that presents product documentation with or without annotation(s) to an annotation content viewer. For example, the user interface module 211 may cause user interfaces to be displayed on client device 103 to present different document content to different requesting users. In another implementation, the user interface module 211 may communicate with the analytics module 209 to generate overall analytical data and/or report for displaying to an administrator. The user interface module 211 may generate graphical data for providing other user interfaces to annotator(s) and annotation content viewer(s).

Figure 2B:
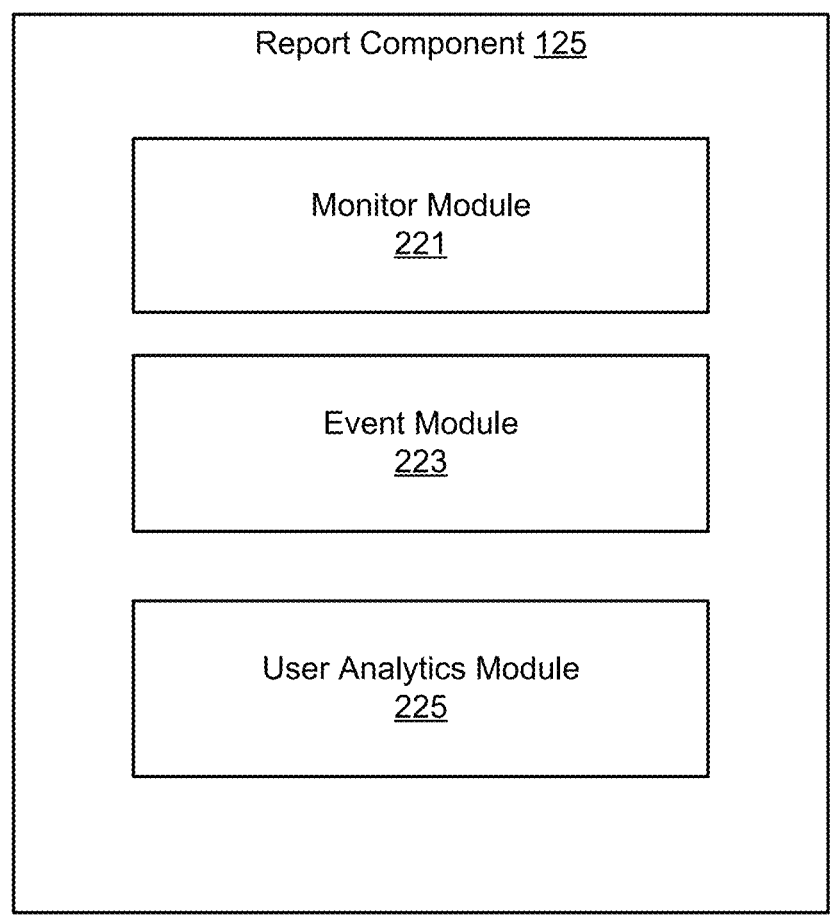
FIG. 2B is a block diagram of example components of a report component residing on a report server.

Referring now to FIG. 2B, it is a block diagram of example components of a report component 127 residing on the report server 121. The report component 127 may track document uses from end-users of a particular entity and report the document use statics associated with the particular users in that particular entity. In one implementation, the report component 127 may include a monitor module 221, an event module 223, and a user analytics module 225. The monitor module 221 may communicate with the annotation authoring server 101 and the client devices 103 to identify, track, and gather data of the user interactions with product documents from end-users of the particular entity. The user interaction may include at least one of a search, view, edit, comment, or other types of interactions with a product document. The monitor module 221 may also attach metadata to the received data such as the receiving time of the user interaction, an identifier of the user associated with the user interaction, etc. The monitor module 221 transmits the user interaction data and associated metadata to the event module 223.

The event module 223 may categorize the user interaction data and transmit the categorized data for further processing by the user analytics module 225. In one implementation, the event module 223 may identify and classify the user interaction data as events such as user engagement events and annotation events (e.g., based on the metadata associated with the user interactions), and transmit the events for storing in an event database included in the data store 129. An annotation event describes the event related to adding text to a default product document, inserting images to the default document, inserting audio/video files and/or other data to the default document, hiding some content of the default document, etc. A user engagement event describes the event that a user searches the default document, requests the default document, views the default document, etc.

Once the event data is stored, the user analytics module 225 may retrieve and analyze the event data to generate graphical data and produce a report based on the graphical data. The analytical or statics data shows an overall usage and performance of the product documentation in that entity. For example, the analytical data may indicate which pages users have annotated, how users access the pages, which pages that users have most problems or questions with, etc. The user analytics module 225 may generate a report based on the analytical data. The report may be visible by specific user(s) such as administrators with annotator roles. For example, an IT manager of an organization may have the rights to view a report showing usage and performance data for each help article and read user feedback for each help article.

The user analytics module 225 may perform some functionalities like those of the analytics module 209. The analytics module 209 performs data analysis related to product use from the vendor/manufacturer's perspective based on data received from all product consumers. Because of the annotator role and annotation content viewer role assigned to end-users of each individual product consumer, an entity gains an access point to the data about how its users are utilizing a product. Thus, the user analytics module 225 may perform product usage data analysis and obtain specific value from the entity's perspective. For example, the user analytics module may generate a report to identify specific efficiencies and provide recommendations about how to create and deliver customized training to specifically address the identified efficiencies within an entity's user base. On the other hand, without this role assignment mechanism, if an entity wants to determine the value it receives from its product purchase/licensing, it will have to conduct a survey to determine its employees' satisfaction with the tool or utilize some other qualitative or anecdotal measure to attempt to determine the value.

Figure 5A:
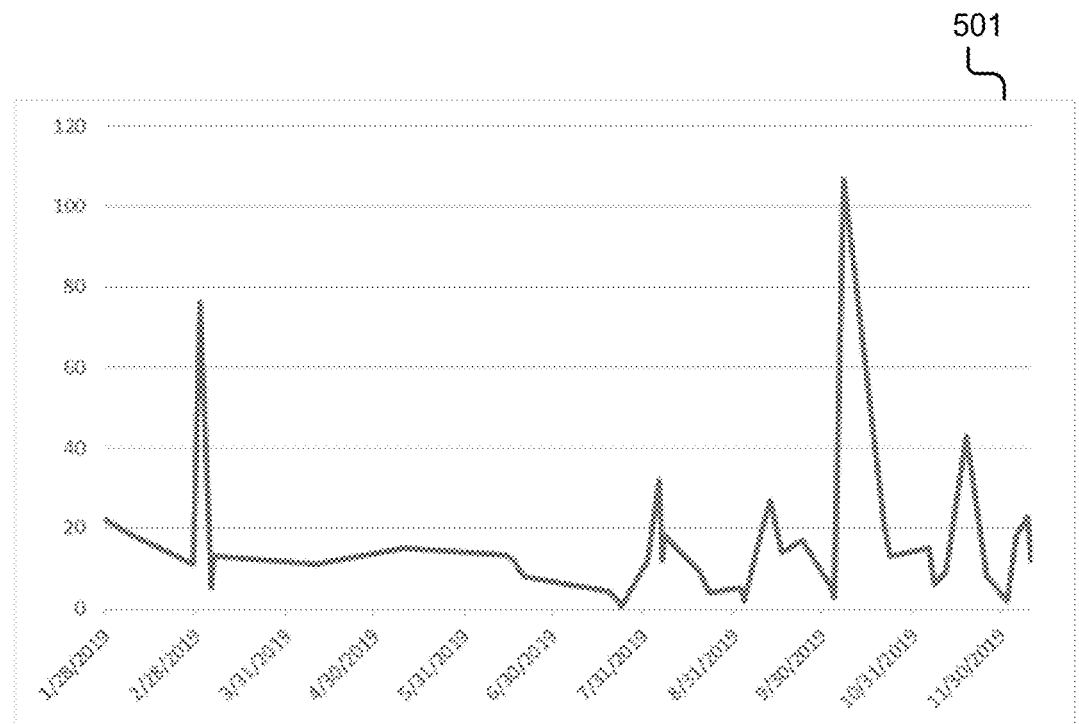
FIGS. 5A and 5B are example graphical user interfaces of reports.
Figure 5B:
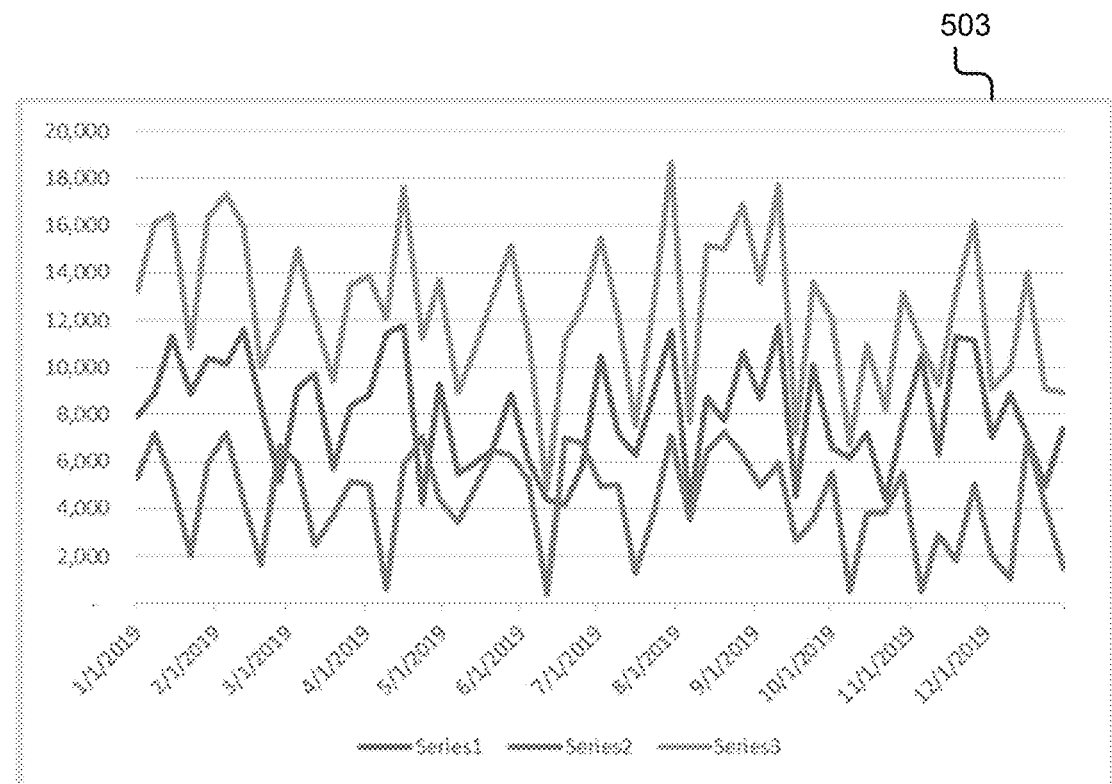

Each time when an end-user of an entity accesses self-serve help content containing the annotations of that entity, the monitor module 221 tracks the usage and feedback data for that end-user. The event module 223 categorizes the data. The user analytics module 225 analyzes the data to determine how many times the end-user has accessed the pages, how often and when the end-user has clicked "Contact Us" that is redirected to internal resources, etc. The user analytics module 225 may also determine how many annotations have been added to the help pages, who added the annotations, at what time the annotations were added, what articles are most frequently accessed, whether and what feedback end-users have left on each article, etc. The user analytics module 225 generates a report based on the analytical data. FIGS. 5A and 5B are example graphical user interfaces of reports. FIG. 5A shows a report 501 with a total number of annotations added by users of one entity during a specific time interval. FIG. 5B compares the number of annotated pages, non-annotated pages, and an aggregated result of help content usage in report 503. Based on the reports as shown in FIGS. 5A and 5B, in one implementation, the user analytics module 225 may communicate with a notification module (not shown) to notify one or more annotators to provide further annotation(s) to clarify specific feature(s) or take other actions.

Figure 6:
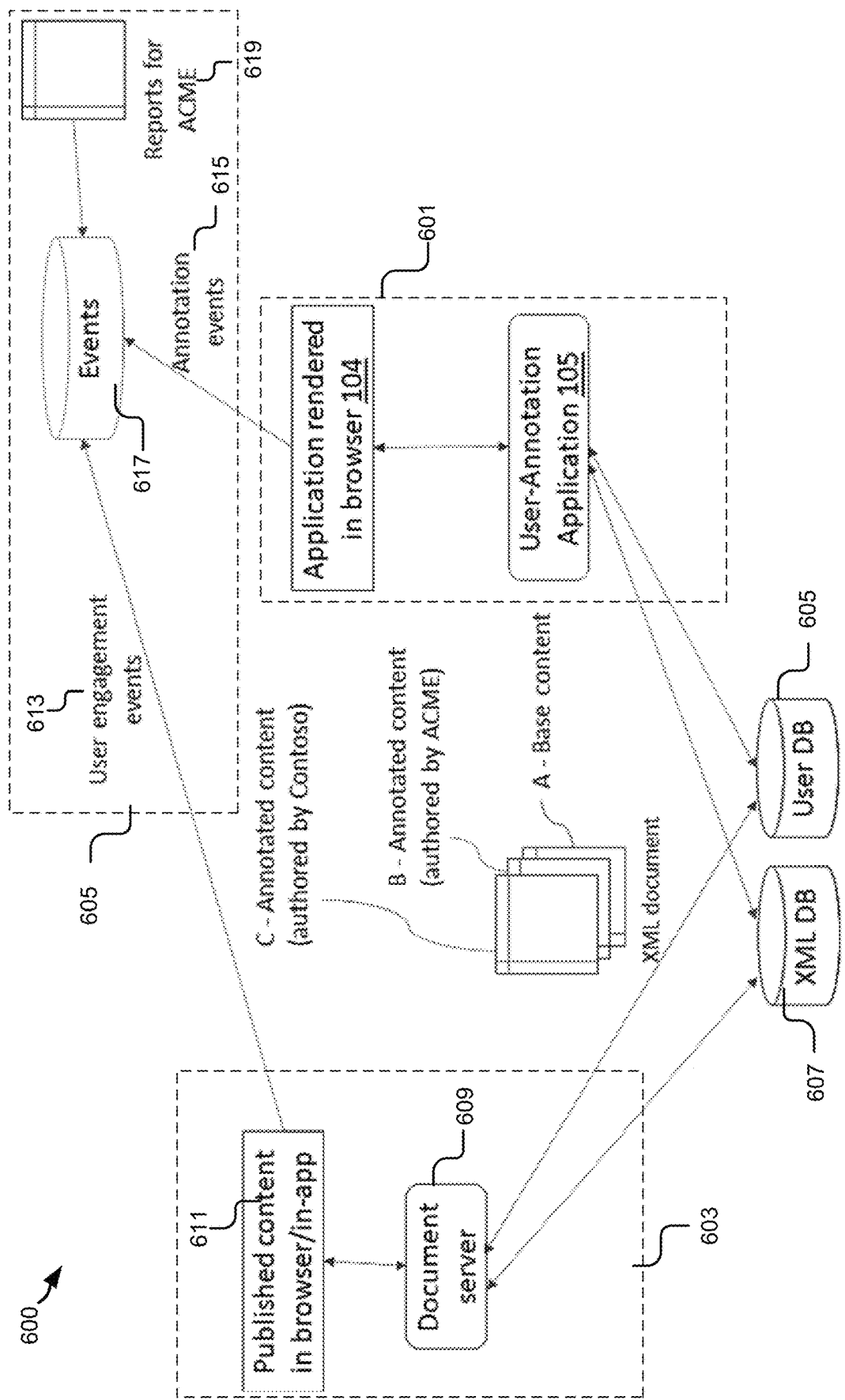
FIG. 6 is a block diagram of an example overall procedure of receiving and processing an annotation.

FIG. 6 is a block diagram 600 of an example overall procedure of receiving and processing an annotation. The procedure may include operations of adding, viewing, and reporting that respectively correspond to the three stages shown in 601, 603, and 605. As shown in 601, an application rendered in the browser of a client device 103, e.g., user-annotation client 104, may communicate with the user-annotation application 105. The application may be Microsoft C3 Tool®. The user-annotation application 105 may allow an annotator to create a layer of annotation upon the content of a product document via the user-annotation application rendered 104 in a browser. The user-annotation application 105 may retrieve user data about a user from a user database 605 to determine whether this user has an annotator role. The user-annotation application 105 may also obtain information about Extensible Markup Language (XML) product documents from an XML document database 607. As shown in the example of FIG. 6, on top of the base layer/content A, a layer of annotation B from company ACME and a layer of annotation C from company Contoso are received. For example, the annotation module 205 may provide an authoring interface (e.g., in FIG. 4A) for an annotator to input the content and select a submit option to add the annotation. Once annotations are added, the user-annotation application 105 may prepare to select the layer of B or C to merge into the base layer A, and output the merged or unmerged layer(s) of content to a requesting user. Each annotation B or C applied by ACME or Contoso is attached with metadata of the given company. Depending on the user role associated with the requesting user and the annotation metadata, the user-annotation application 105 may determine to provide which layer(s) of content to the user.

At a certain time, a user 125a may request access to the base content A via the user-annotation client 104 rendered in the browser of the client device 103, the viewing stage at 603 starts. Responsive to the request from user 125a, the user-annotation application 105 may identify the appropriate content, retrieve the identified content from the document server 609, and cause the retrieved content to be published or present 611 on the browser associated with the client device 103a. The document server 609 and the server hosting the user-annotation application 105 may be separate or be integrated into a single server. For example, if the user 125a is from company ACME, the user-annotation application 105 may merge content A and B for outputting to the user 125a. If the user 125a is from company Contoso, the user-annotation application 105 may merge content A and C for outputting to the user 125a. However, if the user 125a is not an employee in either ACME or Contoso, the user-annotation application 105 would only return the default/base content A to the user 125a. Although user 125a can only see the annotation made to his/her company but not other companies' annotations, the user-annotation application 105 would allow the product vendor to access every annotation. Similarly, if an annotator from ACME hides certain content that may create confusion to ACME users, the viewer module 207 may not present the hidden content to ACME users. However, the user-annotation application 105 would expose ACME's hidden content to other users from other companies.

The annotation processing is also used for reporting in 605. Assume the user 125a is an end-user of company ACME. The document request from user 125a may trigger the reporting process performed by the report server 123 of the company ACME. The report server 123 may use the report component 127 to classify the access request from user 125a and the responding document presentation to the user 125a as user engagement events 613. The report component 127 may also identify annotation B as related annotation events 615. Based on the user engagement events 613, the annotation events 615, and other event data retrieved from the event database 617, the report component 127 may generate a report 619 to company ACME. This report may include user performance/feedback/usage metrics that reflect what is happening on the site as well as capturing overall product document uses in company ACME.

Figure 7:
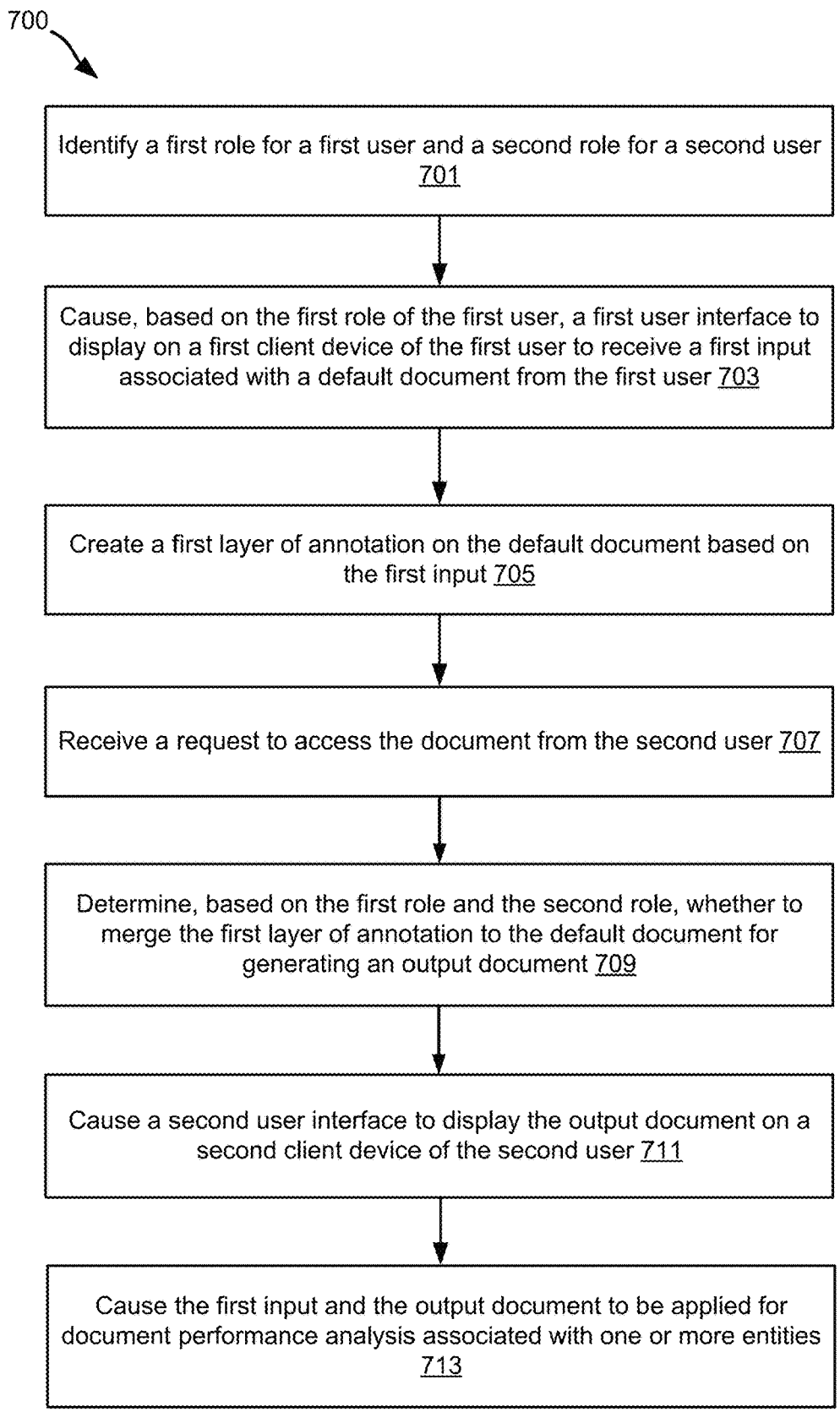
FIG. 7 is a flowchart of an example method for performing role-based user annotation of product documentation.

FIG. 7 is a flowchart of an example method 700 for performing role-based user annotation of product documentation. The method is implemented by a user-annotation application 105 of the annotation authoring server 101 communicating with the client device 103 and the report server 123. At block 701, the user-annotation application 105 identifies a first role for a first user and a second role for a second user. The first user and the second user are authenticated end-users from one or more entities that use a certain product and access corresponding product documentation. A user role can be an annotator role or an annotated content user role. At block 703, the user-annotation application 105 causes, based on the first role of the first user, a first user interface to display on a first client device of the first user to receive a first input associated with a default document from the first user. If the first role is an annotator role for a first user, the user-annotation application 105 may accept the first user's input to the default document. The default document is a self-serve product document created and modified by a product vendor. The default document may include a help article, virtual agent-bot-dialog, instant answer, multimedia deliverable, etc. The first user interface may be an authoring interface including editing tools for the first user to input data related to the default document. The editing tools provided to the first user may be a subset of editing tools available to manufacturer/vendor publishers/editors, i.e., users with "content writer" roles. At block 705, the user-annotation application 105 creates a first layer of annotation on the default document based on the first input from the first user. In one implementation, the first layer of annotation is a logical layer of the default document or an overlay on top of the content of the default document. The annotation may be created to add text, insert an image, or hide some content of the default document.

At block 707, the user-annotation application 105 receives a request to access the default document from the second user. At block 709, the user-annotation application 105 determines, based on the first role and the second role, whether to merge the first layer of annotation to the default document for generating an output document. The first role is an annotator role for the first user in a first entity. If the second role is an annotated content user role for the second user in the first entity, the user-annotation application 105 may include the first layer of annotation along with the default document in the output document. However, if the second role is an annotator role or an annotated content user role for the second user in the second entity, the user-annotation application 105 may include only the default document in the output document. At block 711, the user-annotation application 105 causes a second user interface to display the output document on a second client device of the second user. At block 713, the user-annotation application 105 causes the first input and the output document to be applied for document performance analysis associated with one or more entities.

Figure 8:
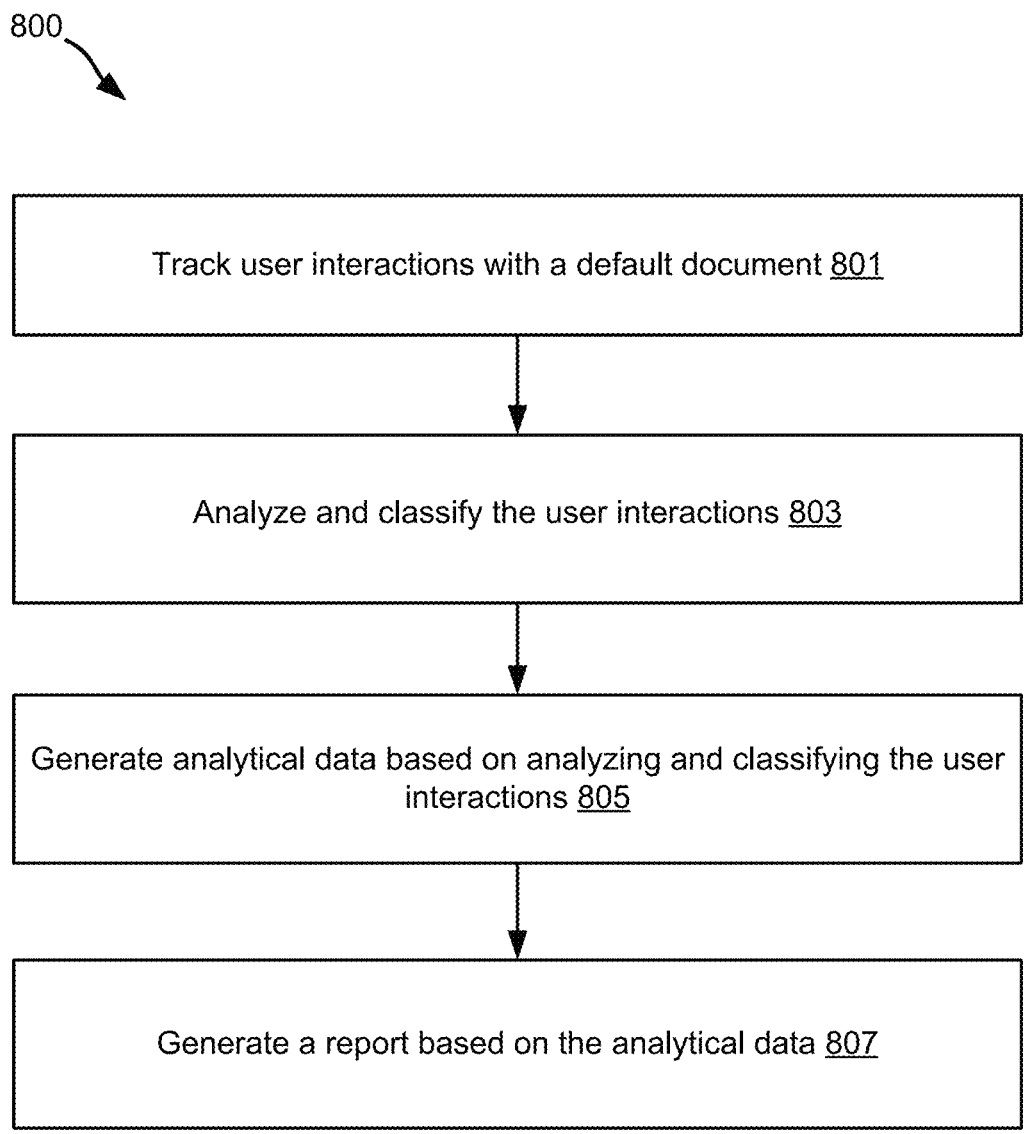
FIG. 8 is a flowchart of an example method for generating a report for a product consumer
Figure 9:
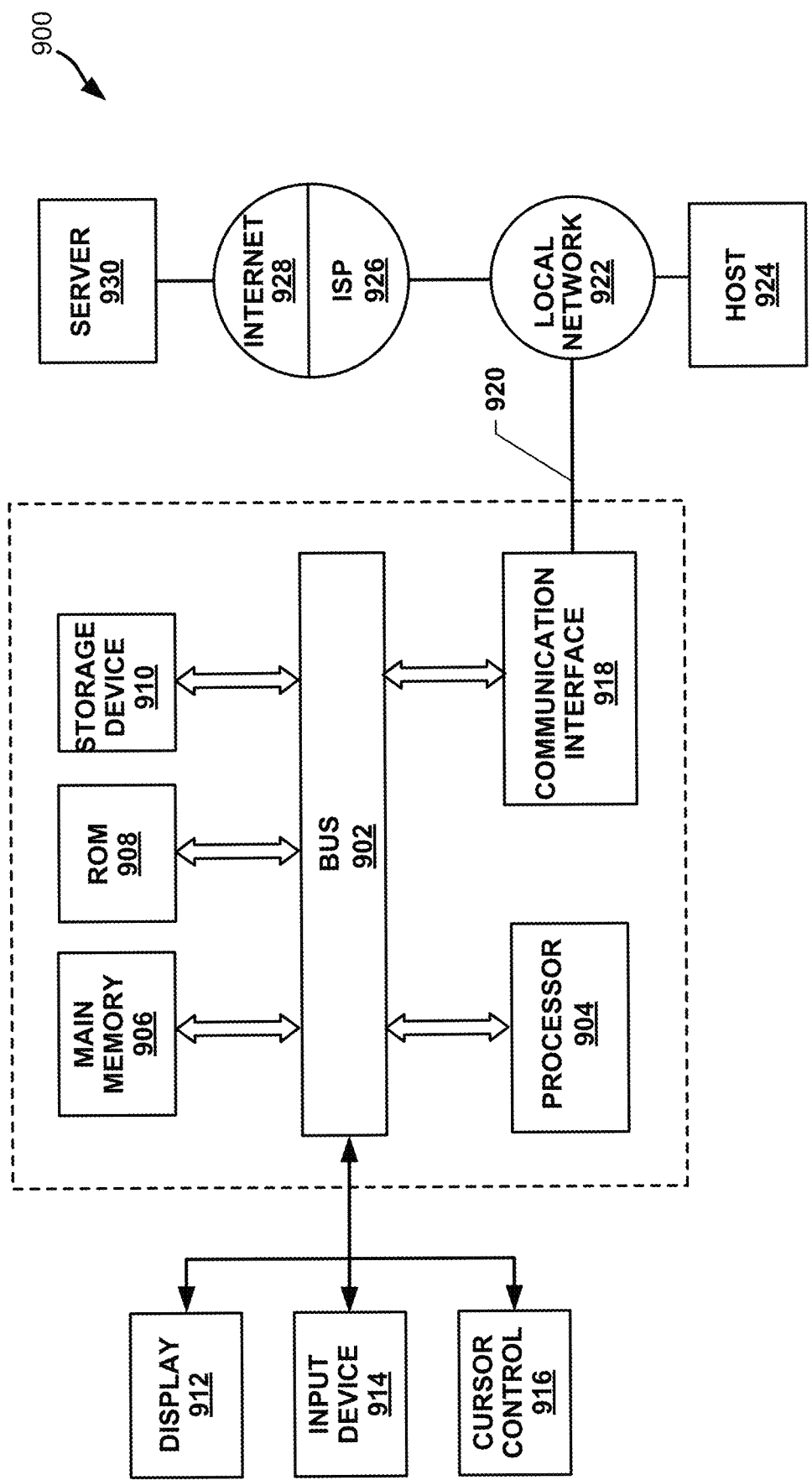
FIG. 9 is a functional block diagram of an example computer system upon which aspects of this disclosure may be implemented.

FIG. 8 is a flowchart of an example method 800 for generating a report. When this report includes usage and performance data with product documentation from end-users of one entity/product consumer, the report server 123 may communicate with the client device 103 and the annotation authoring server 101 to perform the process of generating the report. In one implementation, the report server 123 includes a report component 127. At block 801, the report component 127 may track user interactions with a default document. The user interactions include at least one of the search, view, edit, feedback related to the default document. For example, each time when an end-user of an entity accesses self-serve help content containing the annotations of that entity, the report component 127 may track the usage and feedback data for that end-user. At block 803, the report component 127 may analyze and classify the user interactions. At block 805, the report component 127 may generate analytical data based on analyzing and classifying the user interactions. For example, the report component 127 may analyze the data to determine how many times the end-user has accessed pages of the document, how often and when the end-user has clicked "Contact Us" that is redirected to internal resources, etc. The report component 127 may also determine how many annotations have been added to the help pages, who added the annotations, at what time the annotations were added, what articles are most frequently accessed, whether and what feedback end-users have left on each article, etc. At block 807, the report component 127 may generate a report based on the analytical data FIG. 9 is a functional block diagram of an example computer system 900 upon which aspects of this disclosure may be implemented. It will be understood that the logic blocks illustrated in FIG. 9 represent functions, and do not necessarily correspond to particular hardware on a one-to-one basis. The computer system 900 can include a data processor 904, coupled by a bus 902 to an instruction memory or main memory 906, a read-only memory 908, and a storage device 910. The instruction memory 906 can include a tangible medium retrievably storing computer-readable instructions, that when executed by the data processor 904 cause the processor to perform functions, processes, and operations described herein, for example, in reference to FIGS. 1-4.

The computer system 900 can also include a display 912, a user interface or other input device 914, and a cursor control 916, either as separate devices or combined, for example, as a touchscreen display. The computer system 900 can also include a communications interface 918, configured to interface with a local network 922 by a bus 920 for accessing a local host server 924, and to communicate through an ISP 926 to the Internet 928, and access a remote server 930.

Some implementations comprise a computer-readable storage media including executable instructions, that when executed on at least one processor, cause the processor to perform any of the above-described methods.

While various implementations have been described, the description is intended to be exemplary, rather than limiting, and it is understood that many more implementations and implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications, and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 106, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus the following claims are hereby incorporated into the Detailed Description, with each claim standing on its own as a separately claimed subject matter.

What is claimed is:

1. A system for annotating a default document by a user, the system comprising:
   a processor; and
   a memory, coupled to the processor, configured to store executable instructions that, when executed by the processor, cause the processor to:
   identify a first role for a first user and a second role for a second user;
   cause, based on the first role of the first user, a first user interface to display on a first client device of the first user to receive a first input associated with the default document from the first user;
   create a first layer of annotation on the default document based on the first input;
   receive a request to access the document from the second user;
   determine, based on the first role and the second role, whether to merge the first layer of annotation to the default document for generating an output document;
   cause a second user interface to display the output document on a second client device of the second user; and
   cause the first input and the output document to be applied for document performance analysis associated with one or more entities,
   wherein determining whether to merge the first layer of annotation to the default document for generating the output document includes:
   determining that the first role for the first user is an annotator role for a first entity;
   determining that the second role for the second user is an annotator role for a second entity; and
   upon determining that the first role for the user is the annotator role for the first entity and the second role for the second user is the annotator role for the second entity, not merging the first layer of annotation to the default document.

2. The system of claim 1, wherein the first role is an annotator role for the first user in a first entity, and the output document includes the default document along with the first layer of annotation if the second role is an annotated content user role for the second user in the first entity.

3. The system of claim 1, wherein the first layer of annotation is a logical layer of the default document or an overlay on top of content of the default document.

4. The system of claim 3, wherein the first layer of annotation is created to add text, insert an image, or hide content of the default document.

5. The system of claim 1, wherein, to cause the first input and the output document to be applied for document performance analysis associated with one or more entities, the executable instructions further include instructions that, when executed by the processor, cause the processor to:
   transmit the first input from the first user and the output document displayed to the second user to a report server, wherein the report server, in response to receiving the first input and the output document, is configured to:
   track user interactions with the default document, wherein the user interactions include at least one of search, view, edit, feedback related to the default document;
   analyze and classify the user interactions;
   generate analytical data based on analyzing and classifying the user interactions; and
   generate a report based on the analytical data.

6. The system of claim 5, wherein the executable instructions further include instructions that, when executed by the processor, cause the processor to cause a third user interface to be displayed on the first client device of the first user, the third user interface being configured to receive a second input from the first user, the second input being displayed in addition to the first input.

7. The system of claim 1, wherein prior to identifying the first role for the first user and the second role for the second user, the executable instructions further include instructions that, when executed by the processor, cause the processor to:
receive credential data from the first user and the second user;
authenticate the first user and second user based on respective credential data; and
responsive to authenticating the first user and second user, identify the first role for the first user and the second role for the second user based on respective user data retrieved from a user database.

8. The system of claim 1, wherein the executable instructions further include instructions that, when executed by the processor, cause the processor to:
receive a plurality of inputs of the default document from a plurality of users;
create a plurality of layers of annotation on the default document based on the plurality of inputs;
identify a number of layers of annotation based on the second role of the second user and a plurality of roles associated with the plurality of users; and
merge the identified layers of annotation to the default document to generate the output document.

9. The system of claim 1, wherein the executable instructions further include instructions that, when executed by the processor, cause the processor to create a plurality of layers of annotation on the default document while maintaining the default document unchanged.

10. The system of claim 1, wherein the default document is a product document created and modified by a product vendor.

11. A method for annotating a default document by a user, the method comprising:
identifying a first role for a first user and a second role for a second user;
causing, based on the first role of the first user, a first user interface to display on a first client device of the first user to receive a first input associated with the default document from the first user;
creating a first layer of annotation on the default document based on the first input;
receiving a request to access the document from the second user;
determining, based on the first role and the second role, whether to merge the first layer of annotation to the default document for generating an output document;
causing a second user interface to display the output document on a second client device of the second user; and
causing the first input and the output document to be applied for document performance analysis associated with one or more entities,
wherein determining whether to merge the first layer of annotation to the default document for generating the output document includes:
determining that the first role for the first user is an annotator role for a first entity;
determining that the second role for the second user is an annotator role for a second entity; and
upon determining that the first role for the user is the annotator role for the first entity and the second role for the second user is the annotator role for the second entity, not merging the first layer of annotation to the default document.

12. The method of claim 11, wherein the first role is an annotator role for the first user in a first entity, and the output document includes the default document along with the first layer of annotation if the second role is an annotated content user role for the second user in the first entity.

13. The method of claim 11, wherein the first layer of annotation is created to add text, insert an image, or hide content of the default document.

14. The method of claim 11, wherein causing the first input and the output document to be applied for document performance analysis associated with one or more entities comprises:
transmitting the first input from the first user and the output document displayed to the second user to a report server, wherein the report server, in response to receiving the first input and the output document, is configured to:
tracking user interactions with the default document, wherein the user interactions include at least one of search, view, edit, feedback related to the default document;
analyzing and classify the user interactions;
generating analytical data based on analyzing and classifying the user interactions; and
generating a report based on the analytical data.

15. The method of claim 14, further comprising causing a third user interface to be displayed on the first client device of the first user, the third user interface being configured to receive a second input from the first user, the second input being displayed in addition to the first input.

16. The method of claim 11, wherein prior to identifying the first role for the first user and the second role for the second user, the method further comprising:
receiving credential data from the first user and the second user;
authenticating the first user and second user based on respective credential data; and
responsive to authenticating the first user and second user, identifying the first role for the first user and the second role for the second user based on respective user data retrieved from a user database.

17. The method of claim 11, further comprising:
receiving a plurality of inputs of the default document from a plurality of users;
creating a plurality of layers of annotation on the default document based on the plurality of inputs;
identifying a number of layers of annotation based on the second role of the second user and a plurality of roles associated with the plurality of users; and
merging the identified layers of annotation to the default document to generate the output document.

18. The method of claim 11, further comprising creating a plurality of layers of annotation on the default document while maintaining the default document unchanged.

* * * * *